(12) United States Patent
White (10) Patent No.: US 11,663,872 B2
(45) Date of Patent: May 30, 2023

(54) COMPUTER IMPLEMENTED METHOD OF ONLINE VOTING AND VOTE VALIDATION

(71) Applicant: Benjamin J. White, Gorham, ME (US)

(72) Inventor: Benjamin J. White, Gorham, ME (US)

( * ) Notice: Subject to any disclaimer, the term of this patent is extended or adjusted under 35 U.S.C. 154(b) by 106 days.

(21) Appl. No.: 17/317,129

(22) Filed: May 11, 2021

(65) Prior Publication Data

US 2021/0358253 A1 Nov. 18, 2021

Related U.S. Application Data (60) Provisional application No. 63/023,322, filed on May 12, 2020.

(51) Int. Cl.
  *G07C 13/00* (2006.01)
  *H04L 9/06* (2006.01)
  *H04L 9/00* (2022.01)
(52) U.S. Cl.
  CPC ............ *G07C 13/00* (2013.01); *H04L 9/0618* (2013.01); *H04L 9/50* (2022.05); *H04L 2209/463* (2013.01)

(58) Field of Classification Search
  CPC ......... G07C 13/00; H04L 9/0618; H04L 9/50; H04L 2209/463
  USPC ........................................................... 235/51
  See application file for complete search history.

(56) References Cited

U.S. PATENT DOCUMENTS

| | | | |
|---|---|---|---|
| 6,175,833 B1 * | 1/2001 | West | G07C 13/00 434/323 |
| 11,069,170 B2 * | 7/2021 | Zhang | G06F 21/6263 |
| 2009/0179071 A1 * | 7/2009 | Backert | H04L 9/3249 235/51 |
| 2017/0352219 A1 * | 12/2017 | Spanos | H04L 9/3239 |
| 2018/0102013 A1 * | 4/2018 | Spanos | H04L 9/3239 |
| 2018/0211467 A1 * | 7/2018 | Babic | G07C 13/00 |
| 2019/0213820 A1 * | 7/2019 | Sebes | G07C 13/00 |

\* cited by examiner

*Primary Examiner* — Daniel A Hess (57) ABSTRACT

A computer-implemented method of online voting and of validating said votes that enables votes to access digital ballots on an internet enabled computing device, such as a mobile phone, tablet, or computer, and submit his/her votes in a secure manner that prevents ballot tampering, only counts validated ballots, and informs voters of whether or not their votes were validated and subsequently included in election results.

4 Claims, 9 Drawing Sheets

Step 2 – 30 accessing the digital ballot

COMPUTER IMPLEMENTED METHOD OF ONLINE VOTING AND VOTE VALIDATION

FIELD OF THE INVENTION

The invention relates to a method of online voting and validation thereof.

DISCUSSION OF PRIOR ART

Voting in the United States is almost entirely an in-person process and/or paper-based process. Different states utilize different approaches and technologies, but in almost every state, voters are required to show up at their polling station on election-day if they wish to cast a vote. Alternatively, voters in some situations may obtain physical paper ballots and return them to a polling station in a variety of manners. For many, this is an inconvenience that prevents them from voting at all. Along with other factors, the inconvenience of in-person and paper-based voting contributes to a voter-participation rate in the US far lower than other democracies, particularly in local elections.

Some states have attempted to solve this problem of inconvenience by providing a remote-voting alternative that allows ballots to be submitted without voters needing to present themselves at a polling station on election-day. Again, multiple states allow voters to mail in their ballots. While this method is generally considered more convenient—voters have a window of time between when they receive their ballots in the mail and when they must be mailed back, allowing them to complete their ballot at their leisure—and has been shown to increase voter turnout, it presents a problem with the chain-of-custody of ballots. It is impossible to know definitively whether each ballot submitted has been counted. Because voting protocols strictly prohibit election officials from know who cast which votes, it is not possible to know if a given voter chose not to submit a ballot, or whether that ballot was somehow lost.

Internet-based voting solutions can solve both the convenience and chain-of-custody concern, but current approaches come with a significant down-side. Internet voting platforms and devices are not entirely free from the possibility of vote corruption or hacking. Consequently, any voting process that uses an internet connection is subject to the risk of hacking and vote corruption. It is this possibility—that votes may be altered or erased after they are cast—that largely undermines the effectiveness of internet voting solutions.

Existing internet-based voting technologies seek to secure votes cast online by preventing hacking and corruption through a number of different methods. While some approaches are highly effective, they are unable to prevent every possible attempt at hacking and vote corruption. Ultimately, some votes may be altered or removed entirely. Presently, there is no way to conduct votes via the internet that allows total confidence in uncorrupted results. What is needed, therefor, is an internet-based voting system that can provide the desired convenience while at the same time ensuring that the results of an online election are uncorrupted.

BRIEF SUMMARY OF THE INVENTION

The invention is a computer-implemented system and method of online voting and validation thereof. The voting method is a process that can ensure the validity and integrity of elections conducted via the internet. Validity and integrity are ensured through a process that can accurately determine whether each individual vote has or has not been corrupted. The process consists of five (5) basic steps:

1) An online ballot is created, most likely by election officials using election software.
2) A voter cast the ballot via the internet using a software application in advance of an election-day.
3) The ballots are validated using a comparative process that provides certainty about whether each individual ballot has or has not been compromised, for example, by third-party hacking or some form of harmful software.
4) Ballots that fail validation are discarded. The individual voters who cast ballots that fail validation are informed that their online vote is void, and instructed to vote in the conventional in-person method on election-day process.
5) Uncompromised votes are counted and prepared to be added to the totals of the election-day results.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

FIGS. 1-10 illustrate a computer implemented system and method of online voting and vote validation 100 according to the invention. The computer implemented system and method 100 enables a voter to cast a ballot in an election electronically by enabling the voter to: access a digital ballot on an internet-enabled device; complete the digital ballot with the voter's selection; electronically submit the digital ballot to the proper election authority; have the digital ballot electronically validated to create validated ballots and rejected ballots; and have the validated ballots counted in the election results.

In one embodiment, administrators A at an election office EO are provided with election software that enables them to create the digital ballot that contains all of the necessary ballot questions for a particular voting district. Once the digital ballot is prepared for a particular election the election software makes the digital ballot available to voters V who wish to vote electronically and who are able to use an internet-enabled device D to access and complete the digital ballot through an online voting portal. After the digital ballot is submitted it is transmitted back to the election office EO, or to an electronic storage medium accessible to the election office EO, electronically to be validated, and, if validation is successful, the votes on the ballot are tabulated as a part of the election results at the proper time.

Figure 1:
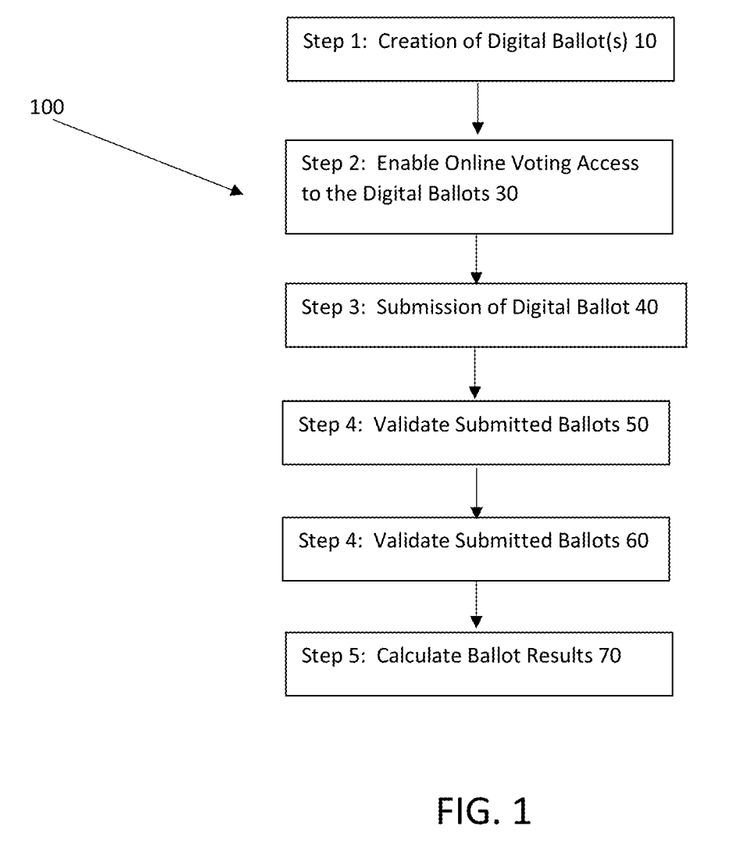
FIG. 1 is a flow chart that illustrates the steps in the computer-implemented method.
Figure 2:
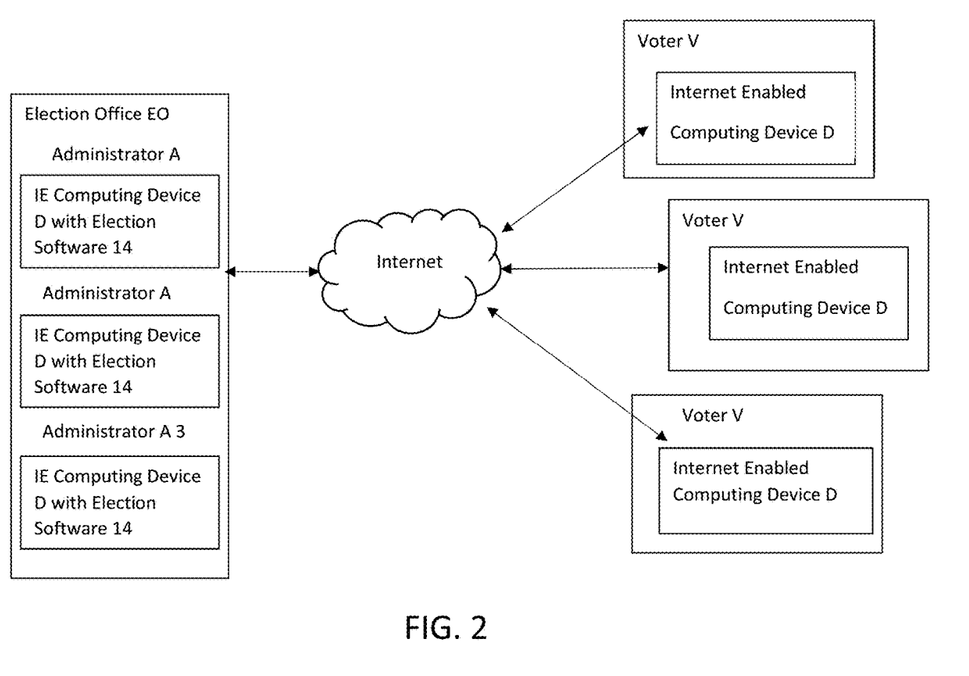
FIG. 2 illustrates the interactions between the election software and the voting software
Figure 3:
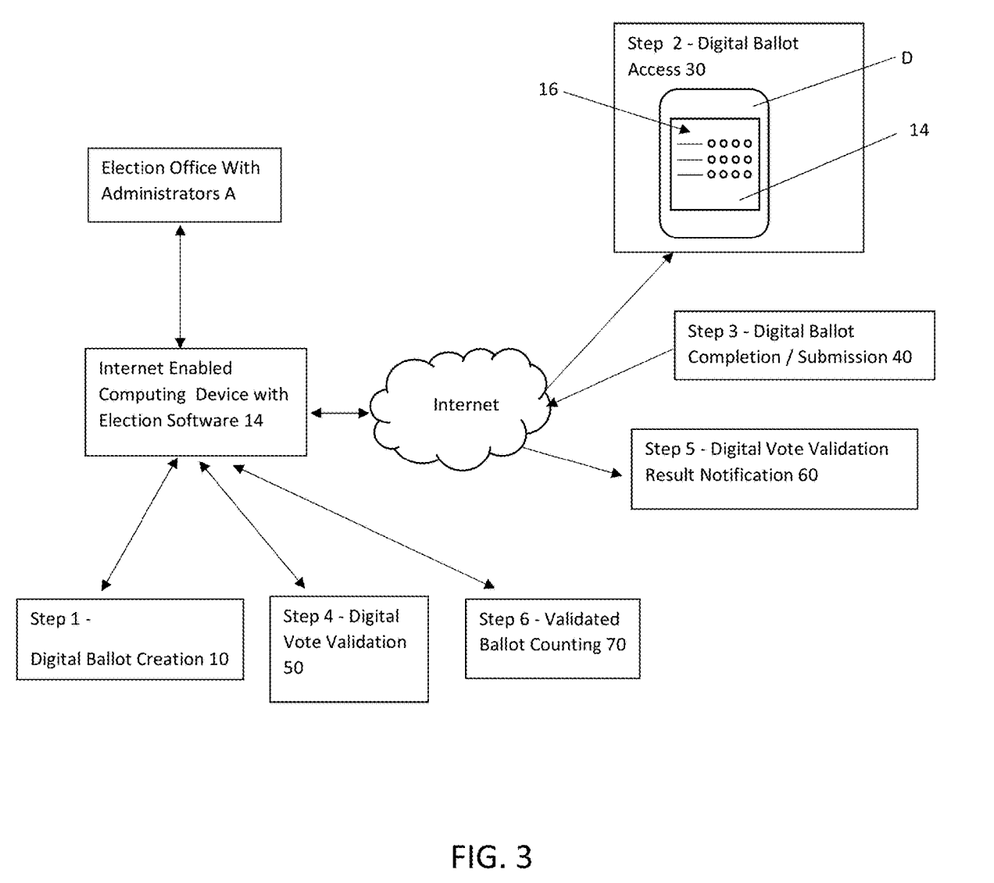
FIG. 3 illustrates the steps in the computer implemented method and the correlating interactions between various devices and the internet.

More specifically, the first step 10 in the method is the creation the digital ballot 12. The Administrators A use the election software 14 to create digital ballot 12 that is then made electronically available to each voter V. Depending on the type of election the Administrators A may be any duly appointed election official in a particular voting district, or a tiered structure may be used where, for example, federal-level officials create country-wide questions, state-level officials create state-wide questions, and local officials create local questions.

In general, the election software 14 is accessed through a graphical use interface ("GUI") that enables the Administrators A to enter ballot questions 16 on the digital ballot 12 that the voters V need to answer in a format that is very similar to a traditional paper ballot.

Similarly, the digital ballot 12 is likely to be made available to the voter V through a "GUI" on the internet-enabled device D and, in this instance, is likely to look and operate much like a conventional paper ballot, presenting each ballot question 16 the voters V are to vote upon with each potential voting option presented with each ballot question 16. It is likely that the options are selected via radio buttons or check boxes in the GUI, however, other technological implementations may also be deployed. Different selection methods may also be deployed for different voting structures, for example, in the case of a city council election, voters may be asked to choose two candidates from a field of five with checkbox buttons. Election administrators may indicate through the software the number of responses that are permitted for each questions, potentially including an option for ranked choice voting.

The Administrators A may also indicate which ballot questions 16 are relevant for which voters V. In a number of races, for example city council, state legislature, US legislature, etc., a given set of candidates is only relevant for a certain voting district. Administrators A may indicate for each ballot question 16 which voters V the ballot question 16 is intended for; e.g. all voters in the state, or only the voters in certain districts.

Once completed, the digital ballot 12 is essentially the digital representation of the paper ballot a voter would have received had that voter gone to his or her polling location to cast said paper ballot.

Figure 4:
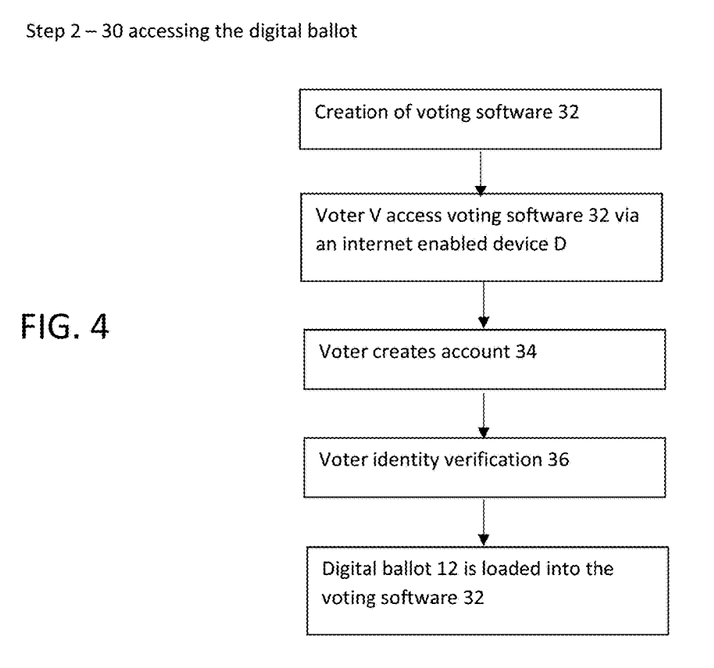
FIG. 4 is a flow chart that illustrates the second step in the method of digital ballot access.

The second step 30 in the method makes the digital ballot 12 available to the voters V digitally over the internet between the Elections Office EO computer systems and the voters V internet-enabled device D.

Figure 5:
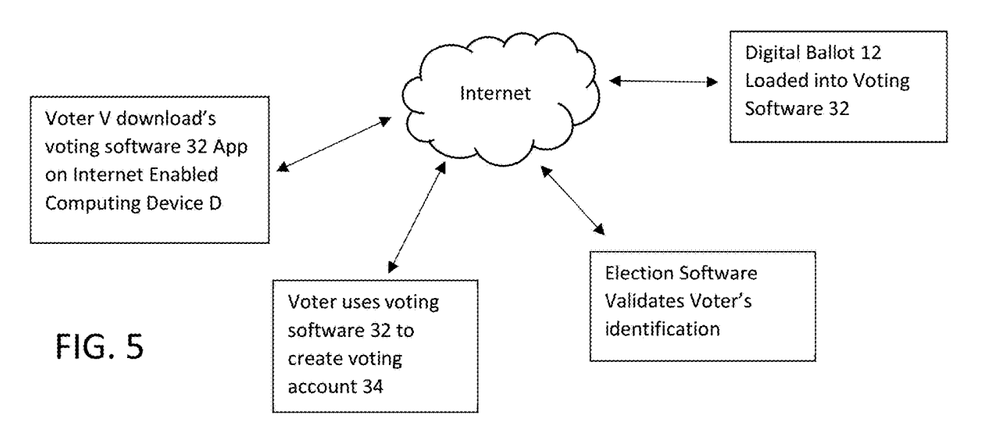
FIG. 5. Illustrates the interactions that occur as the voter access a digital ballot.

The step 30 of making the digital ballot 12 available to the voters V may be completed using a number of conventional techniques. As noted, the voter V must have access to an internet enabled device D and it is likely that said device D has a GUI. Through this device D the voter accesses the digital ballot 12 through voting software 32, likely in the form of either: 1) a web page; or 2) an installed software application, e.g. a traditional computer program on a laptop or desktop computer or an "App" on a smartphone or tablet device.

Once the voter has accessed the voting software, either by visiting a website or installing an application, there are a number of manners in which the voter may be granted access to the digital ballot 12. It is, however, likely that the specific manner of access may vary from one jurisdiction to the next depending on what specific jurisdictions require, largely dependent on voter identification protocols.

In one embodiment, making the digital ballot 12 available 30 initially starts with voter account creation 34. When creating an account, voters V are matched with their voting district to enable the proper ballot questions to be presented on the particular voter's digital ballot 12. Accounts require an email address and password. Two-factor authentication may be required, and biometric login options, such as thumbprint recognition, may be utilized for devices that are able to accept biometric data as inputs.

After the voter's account has been created, the voter identity must be validated 36. This process requires integration with state voter registration records, which may either be automatic or manual, and may require a state identification card ID, e.g. a driver's license. Regardless of whether it is an automatic or manual process, voter validation 36 determines if the account holder is eligible to vote, which political party they belong to, if any, and which district/ward in their state they belong to. Identity validation may take place both upon initial account creation as well as each time the voter accesses the account and/or whenever a ballot is cast. This also may be achieved through the use of biometrics e.g. thumb print, etc., for devices that may accept biometric inputs.

As one example, the GUI may present the voter with fields to enter certain personal identifying information, such as name, date of birth, and address. The election software then accesses a State database of driver license records and matches the voter entered data with the information retrieved from the database, and if the data matches the account or created and/or access is granted. Regardless of the specific implementation, the system must be able to validate the identity of the voter and their voting district with an accuracy equal to or greater than that of a state's existing process.

Once the voter's V identification is validated, access 38 is granted as the election software 14 loads the digital ballot 12 into the voter's voting software 32 once the online voting window is opened and before it closes.

Figure 6:
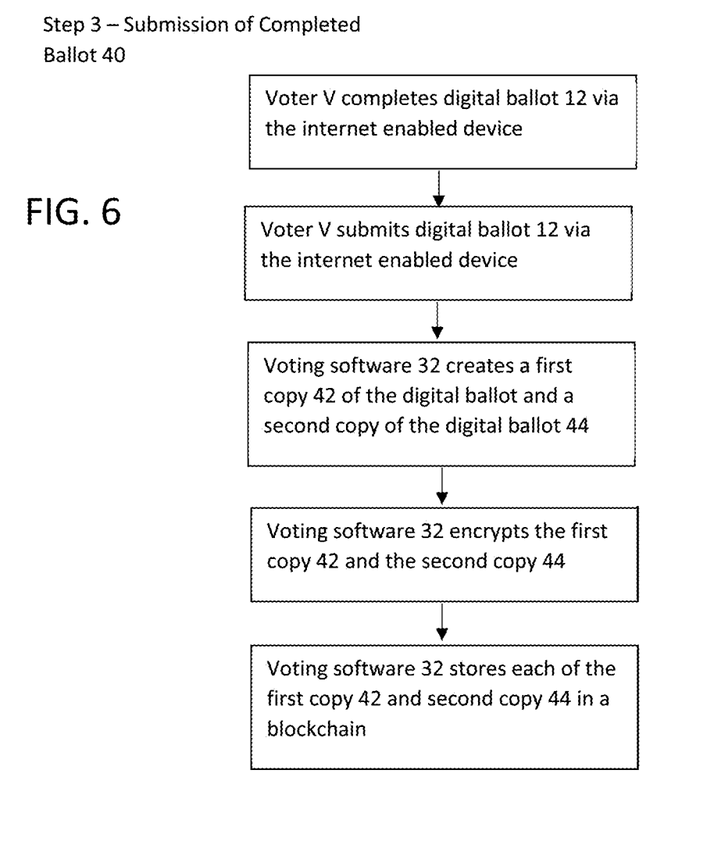
FIG. 6 is a flow chart illustrating the third step of ballot submission.

The third step 40 in the method 100 is to complete and submit 40 the digital ballot 12. The voter uses the voting software 32, which is likely presented in a GUI on the internet enabled device D. When the voter V has used the internet enabled device D to answer the ballot questions 16, the voter uses the voting software 32 to submit the ballot by selecting a 'submit' or 'submit ballot' button on the GUI after which voting software transmits a completed digital ballot.

Submitting 40 the digital ballot 12 causes at least two digital ballot copies 42, 44, of the digital ballot to be created and stored. Each copy 42, 44 is encrypted through the use of conventional data-encryption technology in a way that prevents any person from knowing either, a) which ballot belongs to which voter, or b) which two records correspond with each other. Only the election software 14 is able to properly match the digital ballots 12 to the voter V who submitted the digital ballot 12, and the two records 42, 44 from each voter V to each other, which is implemented to meet standard election protocols which prohibit that anyone has the ability to know which voter has cast which ballot. Additionally, the use of separate voting records 42, 44, each of which includes an encrypted code or key 46, prevents hackers from knowing which records correspond with each other and therefor lessens the likelihood of ballot tampering.

One of the two copies of the digital ballot 12 is a database entry 42. The database entry 42 is assigned an encrypted key that identifies which voter cast it. The database entry 42 may be protected using any number of conventional security strategies; most probably a block-chain technology and encryption of the data itself. This data is stored in any standard cloud-based database system, for example through the use of Structured Query Language ("SQL") or similar such technologies.

The second record 44 is a secure document, for example, a portable document format ("PDF") or other similarly suited document type. This document contains some form of code, for example a Quick Response ("QR") code, bar code, alpha-numeric code, etc., that identifies the voter V to the software and allows for matching against the database entry 42. The code used for the secure document for any given voter is distinct from the one used in the database entry for that voter. Only the election software 14 has the ability to match the two encrypted codes.

The secure document 44 is structured in a way that shows both the ballot questions as well as the selected responses when visible in the election software's 14 GUI and/or printed. As with the conventional in-person ballots the format of this document is such that any person is able to understand, upon looking at the document, which responses are relevant to which questions. This structure allows for the printing of each successful ballot, thus providing a physical record of each successful vote, should that be required, as is likely since elections generally require an auditable trail.

After the two ballot copies 42, 44 are created they are stored on separate blockchains in a conventional manner.

Figure 7:
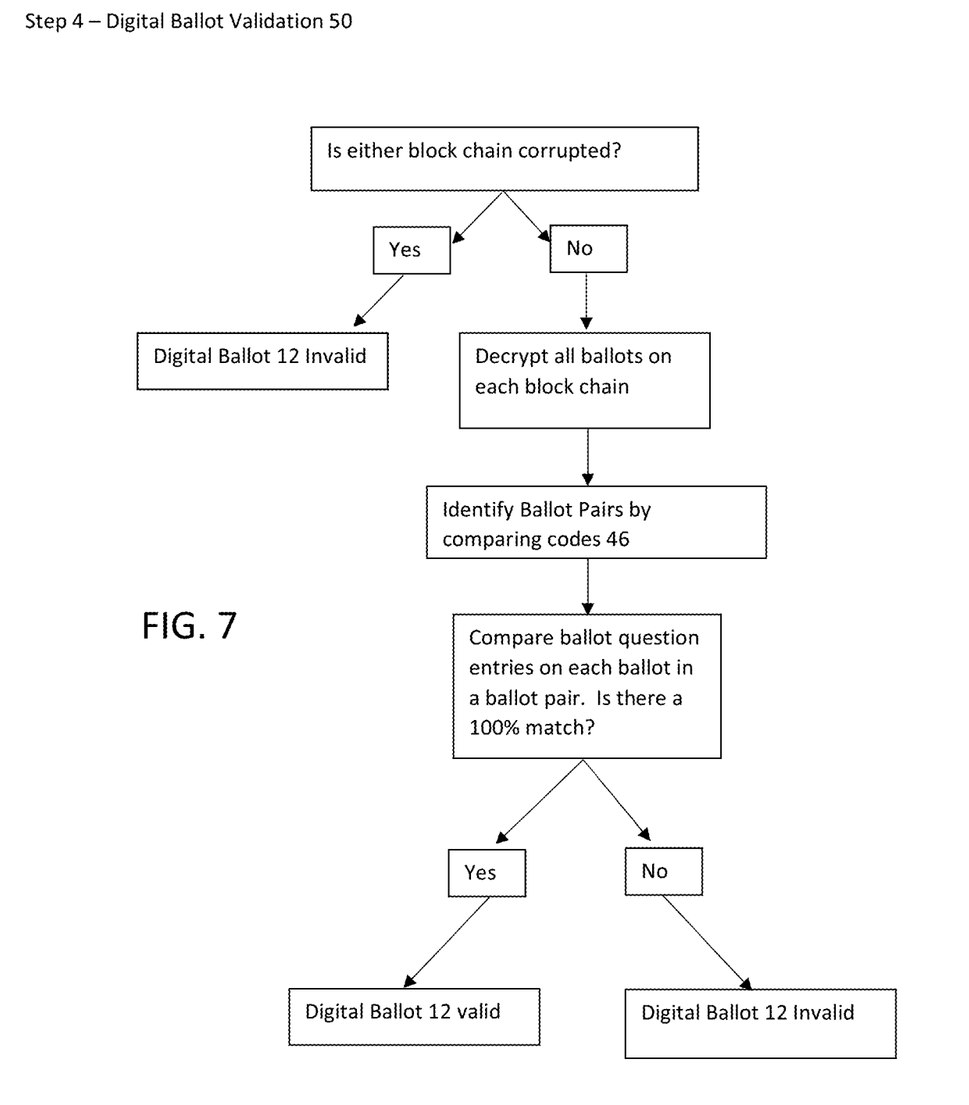
FIG. 7 is a flow chart illustrating the fourth step of ballot validation.
Figure 8:
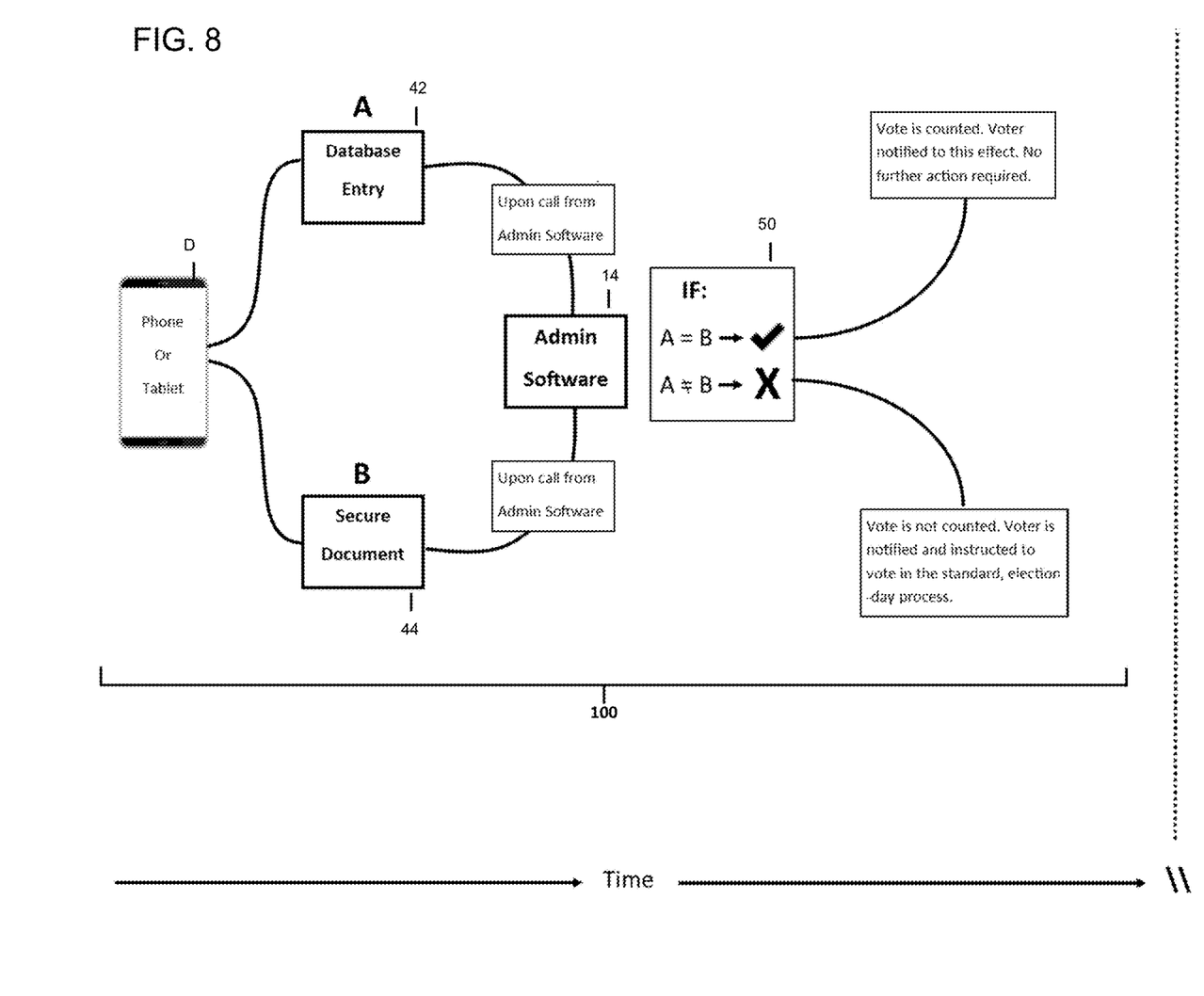
FIG. 8 is a graphical representation of the computer implemented method.
Figure 9:
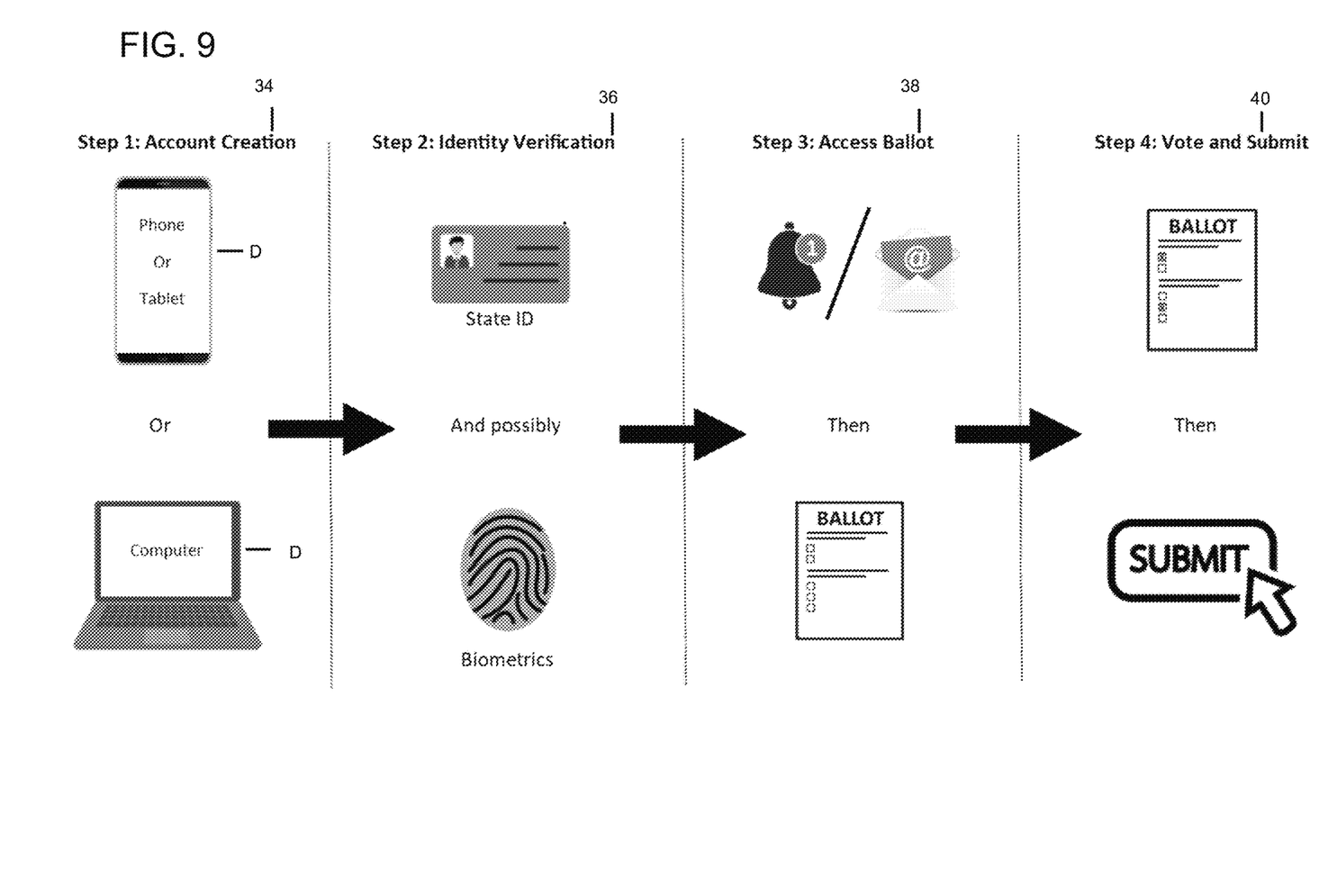
FIG. 9 is a graphical representation of the ballot access and submission steps of the method.
Figure 10:
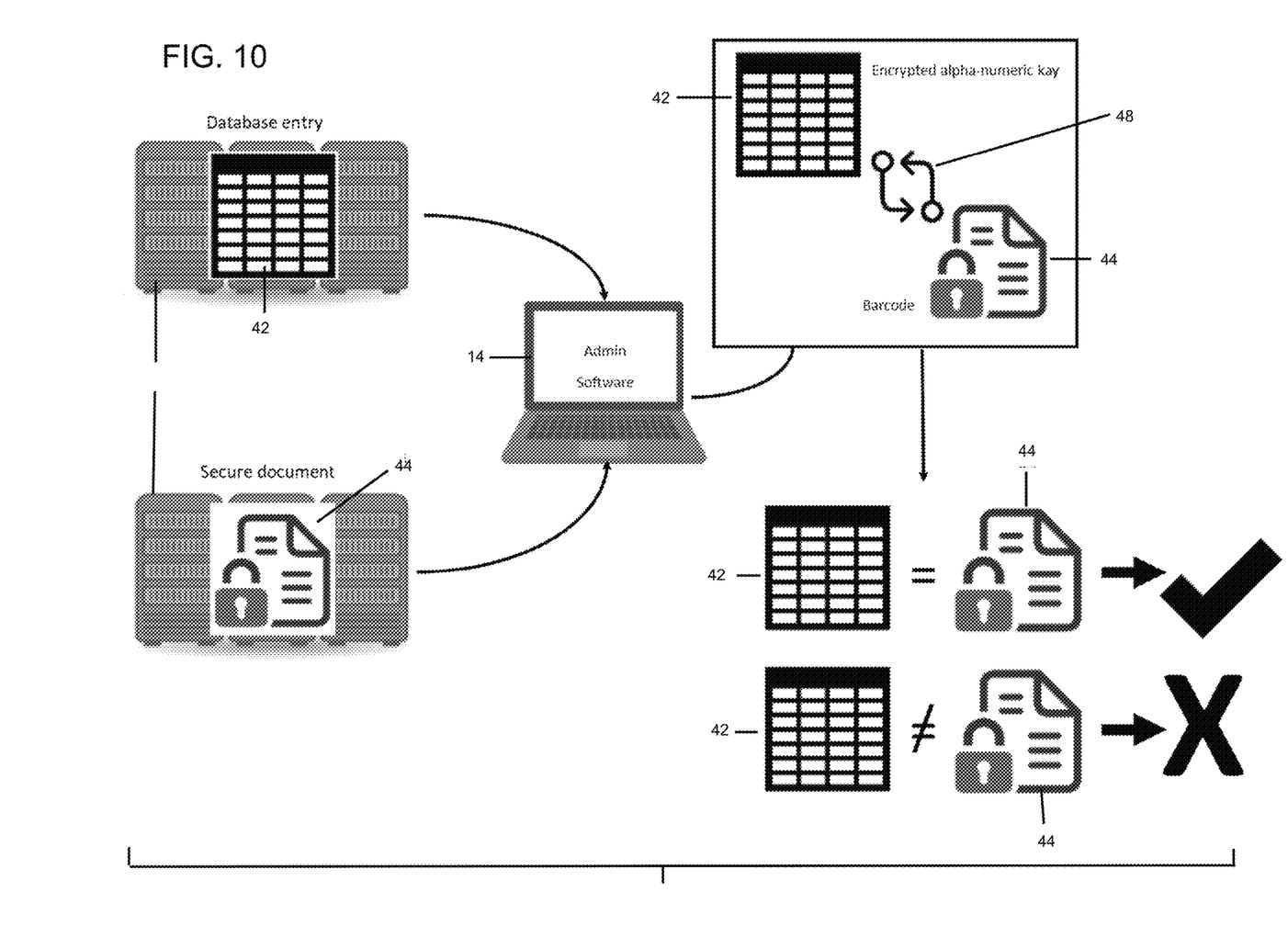
FIG. 10 is a graphical representation to the vote validation step of the method.

The fourth step 50 in the method is for the election software to validate the submitted ballot 12, and in particular the two ballot copies 42, 44. The vote validation process 50 may commence at any time after the ballot 12 is submitted. For example, vote validation may occur as soon as the ballot is submitted, it may occur in a batch the day after the vote is submitted, or it may occur after the online voting window has closed. The first step of validation is to check whether either blockchain has been corrupted. If either blockchain is corrupted the digital ballot 12 is invalidated. If both block chains are free of corruption the election software 14 proceeds to validate the ballot copies 42, 44. This validation has three stages:

Stage 1: the election software 14 decrypts 48 the encrypted codes on each ballot copy 42, 44. In doing so, the election software determines which voter V cast which ballot 12, and thus which database entry 42 corresponds to which secure document 44. There are a number of conventional commercially available programs that may be used to perform this encryption and decryption, for example, VeraCrypt or OpenSSL.

Stage 2: the election software 14 scans the secure document 42 to determine the responses therein. Likely, a locally-stored database entry is created of the secure document responses for the purposes of comparing against the database entry 44 retrieved from the blockchain.

Stage 3: the software compares the responses for each ballot question from the first copy 42 to the second copy 44.

For each ballot copy 42, 44, the election software 14 compares the individual responses for every ballot question and determines whether or not they match. Only ballots with 100 percent match are considered valid, and therefor counted. Any ballots with deviance in any way will be considered void.

The fifth step 60 in the method is voter notification. Once it has been determined which ballots are valid and invalid the election software 14 sends a notification to the voter V via electronic means regarding the success, i.e. validation, or failure, i.e. invalidation, of their online vote. For successful ballots, a simple notification indicating that the voter's ballot has been validated and no further action is required is sent. For unsuccessful ballots—ballots that have been compromised in some way—voters are notified that their ballot was not counted, and instructed to vote in the conventional election-day process. Notifications of the success or failure of a vote may be sent by a number of conventional means, for example, via email or through a notification in the voting software 32.

The sixth step 70 in the method is to count the validated votes. Once legitimate and illegitimate ballots have been determined, the election software 14 produces fully-tabulated results from the validated ballots. These results include the total number of votes for each response option to every ballot question. This is completed by simply adding the votes from the records stored in the databased using conventional means.

For states and municipalities that use a rank choice voting method, the election software 14 includes an option to produce results consistent with that method of eliminating the lowest vote-getter until a majority is reached. Likely, this is achieved by a 'remove candidate and redistribute votes' option available for election administrators to select in the results section of admin-end software. This option only affects how the results are displayed on the screen. No changes are made to the voting records, and election officials always have the opportunity to view the original, un-modified results prior to any redistribution due to Rank Choice.

The election software also provides a list of voters successfully voting on the online process so that election officials may ensure that they are not permitted to participate in the election-day process. As an added feature, for account-holders who have not voted prior to the last day of the online voting window, a reminder may be sent notifying them of the final day to vote online.

As previously discussed, the method 100 is a computer implemented method that is executed on internet-enabled computing devices. The devices and software are all conventional, with the computing devices being any suitable off-the-shelf device that is internet enabled and that has a GUI. The method is implemented using conventional programming languages and conventional programming techniques.

More specifically, the computing device may be a conventional computer system having a conventional processor, such as a microprocessor, and having an operating system such as Microsoft Windows, Apple OS X, or a Linux distribution. The computing device may also be a mobile device such as a smart-phone, tablet, or personal digital assistant that likely uses an operating system such as iOS or DROID.

The method may be implemented to run on the conventional computer system or mobile device using a number of conventional programming techniques in a number of conventionally suitable programming languages. As such, the method may include computer-readable media encoded with a computer program, e.g. software, which includes instructions operable to cause the computing to perform methods of various embodiments. The software implementation, i.e., the computer-implemented method, may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but not limited to, hard disks, removable magnetic disks, removable optical disks, memory cards or sticks, random access memories, read only memories, and other similar such technologies.

Various embodiments of the computer-implemented method implement the one or more software programs in various ways, including procedure-based techniques, component-based techniques, and/or object-oriented techniques, among others. Specific examples include C#, .NET and commercial class libraries. Those of ordinary skill in the art will appreciate that the hardware depicted herein may vary depending on the implementation. The depicted example is not meant to imply architectural limitations with respect to the present invention.

The computing devices may have, or have access to, a data source such as a database. For example, the database may be a conventional database stored on a local hard drive or a networked hard drive, with communication carried via internal hardware or via a hardwired network. Alternatively, or in addition, the data source may also be cloud-based and communication may be carried out via a network using conventional hardwired or wireless technologies.

The method is run over an internet network, which may use any number of standard communication technologies, such as, for example, Ethernet, 802.11, 4G and/or 5G, digital subscriber lines, etc. Similarly, the network may use any number of standard communication protocols, such as, for example, transmission control protocol/internet protocol (TCP/IP), simple mail transfer protocol (SMTP), file transfer protocol (FTP), and/or the hypertext transport protocol (HTTP). The data being exchanged over the network may be represented using known technologies, such as hypertext markup language (HTML), and/or the extensible markup language (XML).

It is understood that the embodiments described herein are merely illustrative of the present invention. Variations in the construction of the system and method may be contemplated by one skilled in the art without limiting the intended scope of the invention herein disclosed and as defined by the following claims.

What is claimed is:

1. A computer implemented system and method adapted to enable a voter to submit a digital ballot to an election office over an internet from an internet-enabled device and to validate the digital ballot after the digital ballot is submitted for inclusion in election results, the method comprising the steps of:
   creating the digital ballot;
   making the digital ballot accessible to the voter on the internet-enabled device via the internet;
   receiving a submitted digital ballot from the voter using the internet-enabled device via the internet, the submitted digital ballot including a first ballot copy as an entry in a database and a second ballot copy as an electronic document, each of the first ballot copy and the second ballot copy being encrypted and each of the first ballot copy and the second ballot copy being stored in separate blockchains;
   validating the submitted digital ballot and marking the submitted digital ballot as a validated ballot or an invalidated ballot, validating the submitted digital ballot including the step of determining whether the encryption of the first ballot copy and/or the second ballot copy has been corrupted and if corrupted, marking the submitted digital ballot as an invalidated ballot; and
   adding validated ballots to the election results.

2. The computer implemented system and method of claim 1, further including the step of:
   notifying the voter if the submitted digital ballot was a validated ballot or an invalidated ballot.

3. The computer implemented system and method of claim 1, wherein the second ballot copy includes a visual presentation of ballot questions and ballot selections.

4. The computer implemented system and method of claim 1, the step of validating the submitted digital ballot further including the steps of:
   decrypting the first ballot copy;
   decrypting the second ballot copy;
   comparing contents of the first ballot copy with contents of the second ballot copy and if the contents match, marking the digital ballot as validated and if the contents do not match marking the digital ballot as invalidated.

* * * * *